Feb. 28, 1967 C. WILLAUER, JR 3,306,259
EGG COLLECTING APPARATUS
Filed June 3, 1965 3 Sheets-Sheet 3

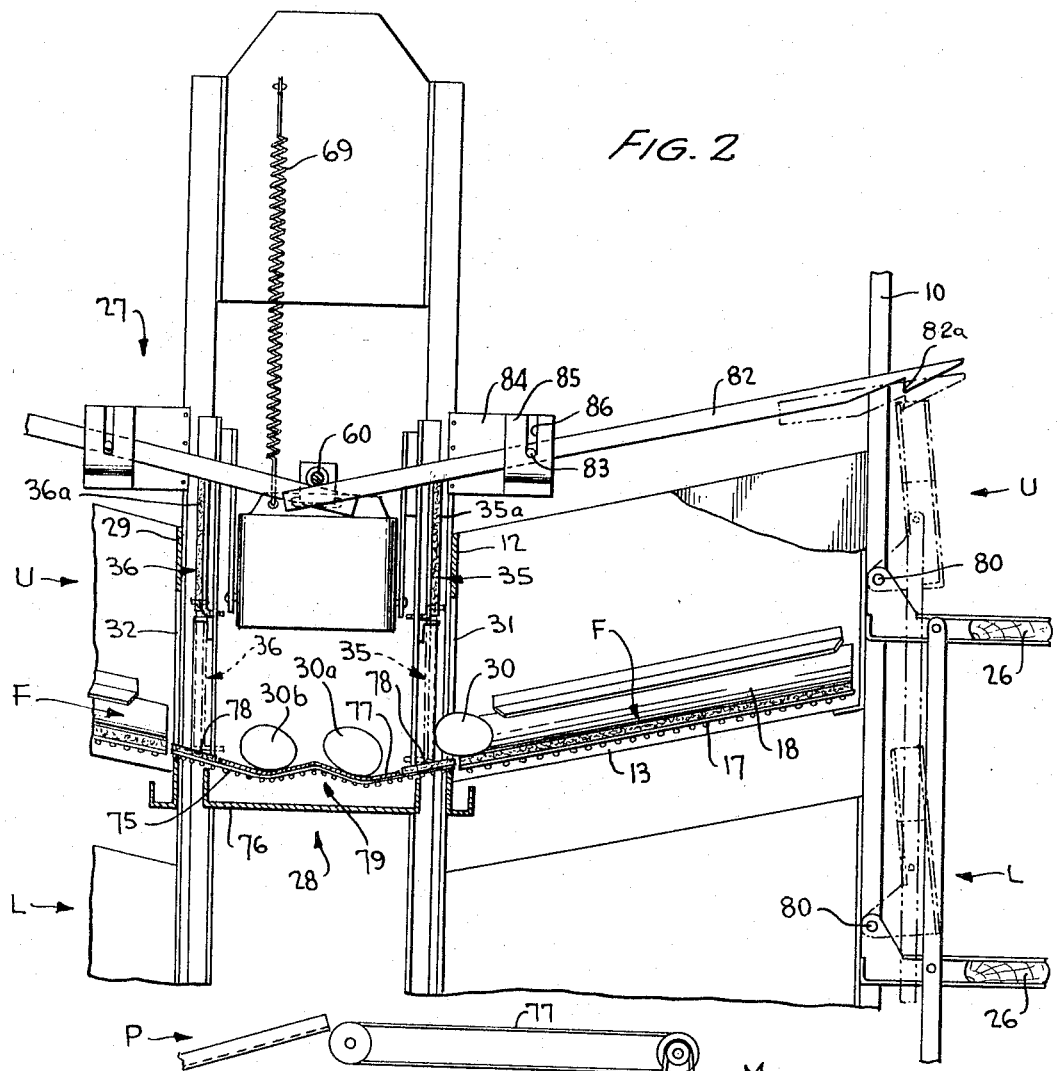
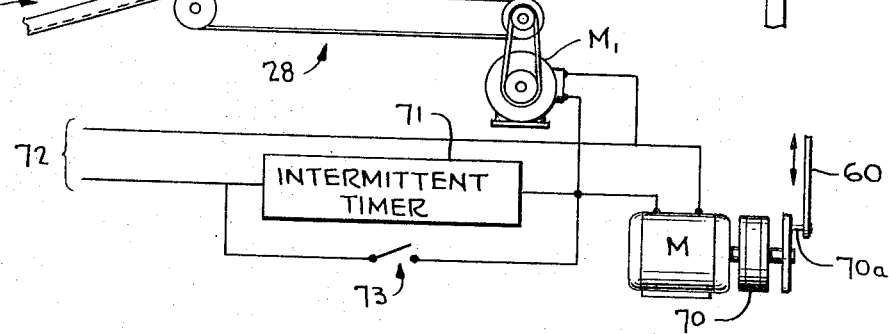

INVENTOR,
CHARLES WILLAUER, JR.
BY
Watson, Cole, Grindle & Watson
ATTORNEYS

United States Patent Office 3,306,259
Patented Feb. 28, 1967

3,306,259
EGG COLLECTING APPARATUS
Charles Willauer, Jr., Quakertown, Pa., assignor to Willauer Machine Company, Inc., Quakertown, Pa., a corporation of Pennsylvania
Filed June 3, 1965, Ser. No. 461,088
13 Claims. (Cl. 119—48)

The present invention relates to laying nests for poultry and, more particularly, to such nests arranged in batteries of one or more horizontal rows of adjoining nests, each nest having a sloping bottom which provides a path for the eggs when laid to roll out of the nest and to be delivered to a desired collection station.

This general type of nest arrangement has recognized advantages over other designs as is clearly pointed out in my prior U.S. patent entitled, Laying Nests for Poultry, 3,139,065, issued June 30, 1964. Also, as pointed out in the patent, it is desirable in laying nests arrangements to retain the egg at least for a reasonable period of time either within the nest or in such proximity thereto so that the hen may be physically close to and able to see the egg. Although the apparatus disclosed in this patent has proven to be successful in attaining increased production and faster training of the hens due to the improved construction, some difficulty has arisen in the successful operation of the device of the patent, particularly along the line of reducing the extent of breakage of the eggs during the collecting operation.

Therefore, it is one object of the present invention to improve nests of the type described so as to reduce the number of eggs lost to breakage or cracking during the collecting operation.

It has been discovered that a primary reason for damage to eggs in nests of the roll-out type is the relatively long distance that the egg must traverse between the point in the nest where it is laid and the collecting trough or conveyor adjacent said nest for collecting the eggs. Accordingly, it is another object of the present invention to retain the egg close to the hen while at the same time reducing the distance which an egg must roll at any one given time so as to reduce the amount of momentum with which the egg strikes a barrier.

Further, it has been found that a substantial number of breakages occur as the result of two eggs colliding on the collecting conveyor and, thus, it is still another object of the present invention to reduce the possibility of eggs coming together during the egg collecting operation while at the same time allowing a rapid and efficient collecting operation to be performed.

More particularly and according to the present invention, a battery of longitudinally and horizontally aligned laying nests are provided, each having a floor sloping downwardly forming a path for delivery of the eggs by gravity transversely onto the trough or conveyor forming a collection station for the apparatus. In order to stop the roll of the egg in the nest proper and retain the egg for a reasonable amount of time for the hen to see it, an egg barrier is supported along the length of said battery of nests for substantially vertical movement into and out of the paths for the eggs moving transversely to the collecting station in accordance with one feature of the present invention. This barrier is operated by novel actuating means in order to allow the eggs that might be in the nests at the time, to roll onto the collecting conveyor in a periodic fashion. Since each of the nests has a common barrier operated by said means, the eggs are all delivered to the conveyor at substantially the same time in readiness for collection as desired.

In the preferred embodiment of the invention, an endless conveyor is provided between a first and second battery of nests arranged in a back-to-back relationship, which receives the eggs from the nests in response to actuation of the novel egg door arrangement of the present invention. According to another feature of the invention this conveyor is formed with downwardly sloping portions to cause the eggs to roll toward the center of the conveyor and away from the respective nests and with a raised portion in the center of the conveyor disposed between the first mentioned oppositely sloping portions to limit the transverse movement of the eggs so that the eggs from the respective nests of the plural batteries of nests are effectively isolated from each other on the conveyor. After the eggs have been positioned by gravity in spaced relationship on the conveyor, the conveyor is conveniently operated in a rapid fashion to transfer the eggs to a desired collection point without the fear of damaging the eggs due to collision with other eggs on the conveyor. Also, in the embodiment shown there are no other obstructions along the conveyor run to cause damage to the eggs during either their transverse movement onto the conveyor or during the longitudinal movement with the conveyor during the final portion of the collecting operation.

Still another aspect and object of the present invention is to provide a battery of laying nests with an egg barrier that is capable of operation for the purpose described with a minimum amount of force and a maximum of smoothness of cooperating parts. For this purpose, the present invention contemplates the use of a series of rocker members mounted for pivotal movement about a horizontal axis adjacent each end of the several units of the apparatus for operating a pair of respective elevator bars operatively connected to the ends of the egg barrier to move the same into and out of the path of the eggs moving transversely to the conveyor, and a reciprocal rod extending longitudinally of the battery of nests and interconnecting the rocker members. In operation, a crank supplies a reciprocating motion to the rod which, in turn, operates the rocker members to raise the egg barriers in response to the upwardly sliding movement of the elevator bar.

A further feature of the present invention lies in the construction of a combined perch and nest door arrangement which is operated by the reciprocating rod that actuates the raising and lowering of the egg doors just described. Thus, a still further object of the present invention is to provide an arrangement wherein the perch will automatically be positioned in readiness for use when the egg collecting apparatus is operating.

In this application, I have shown and described only the preferred embodiment of the invention, simply by way of illustration of the best mode contemplated by me of carrying out my invention. However, the invention is capable of other and different embodiments, and its several details are capable of modification in various obvious respects, all without departing from the invention. Accordingly, the drawings and description are to be regarded as illustrative in nature, and not as restrictive.

Referring to the drawings:

FIG. 2 is a sectional view along lines 2—2 of FIG. 1 and illustrating the novel means for operating the egg door of the present invention;

FIG. 5 is a diagrammatic view of the driving and control means of the present invention.

Figure 1:
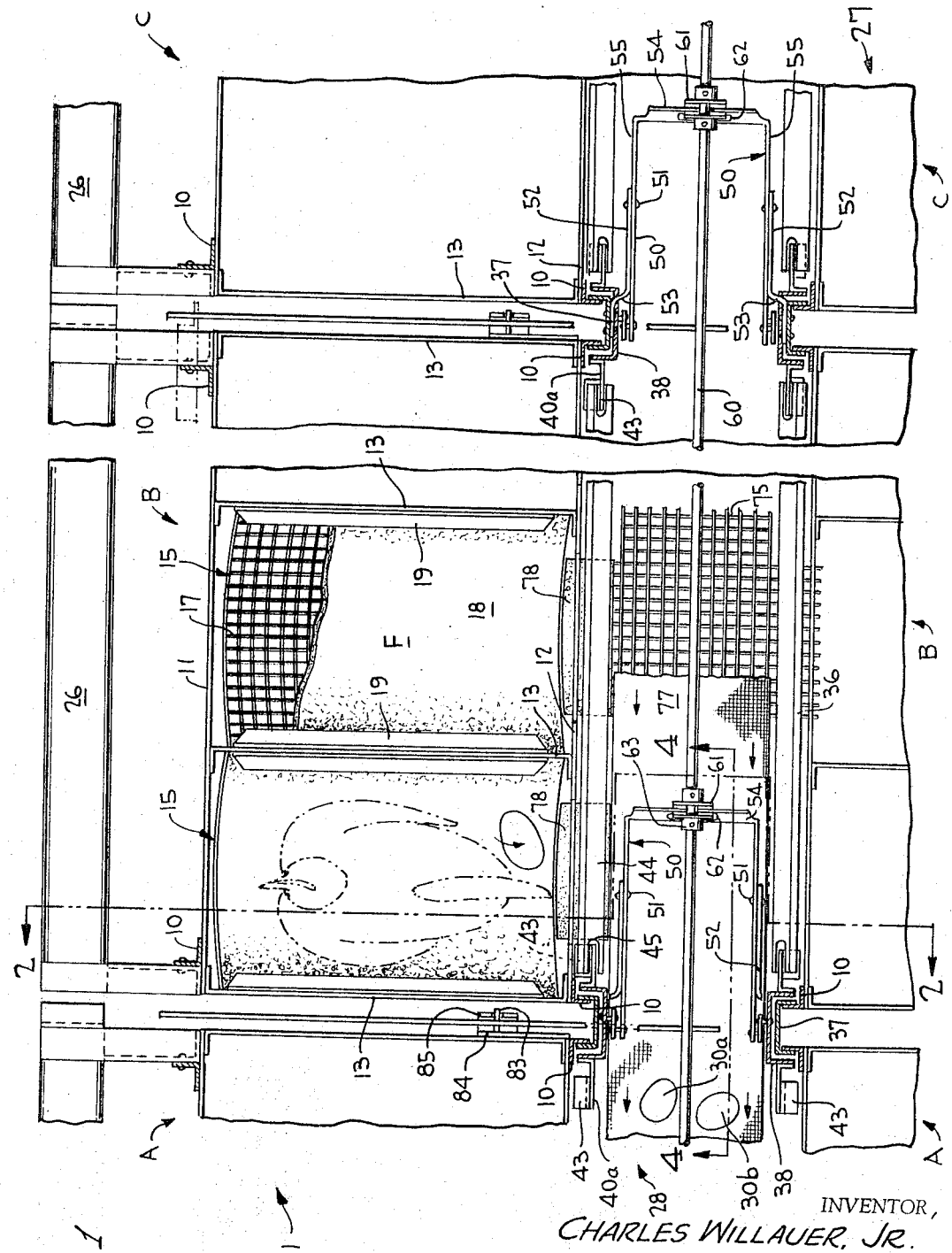
FIGURE 1 is a top plan view partially broken away illustrating a battery of nests positioned in back-to-back relationship with another battery of nests, and incorporating the structure of the present invention.

Referring now to the drawings to specifically explain the invention, and, more particularly, to FIGURES 1 and 2, there is illustrated enough of the overall structure of a battery of nests to describe the improved arrangement with which the present invention is concerned. The basic structure of a battery of laying nests 1 is very similar to the construction illustrated in the aforementioned Patent 3,139,065, and comprises a suitable rigid frame having upstanding vertical posts 10 (see FIG. 2), which posts are interconnected in a rigid fashion by parallel front and rear walls 11, 12. As shown in FIGURE 2, this arrangement forms a series of individual nests 15 in upper and lower tiers or rows U and L, respectively. The nests 15 each comprise a wire mesh forming member 17 disposed beneath a nest pad 18 which is held down in a trough-forming fashion by the transverse members 19.

As will be evident to those skilled in the art, a hen 25 may enter one of the nests 15 through a suitable door in the front wall 11 with the aid of a combined perch and closure member 26, whereupon the nesting position of the hen 25, illustrated in the figure, can be assumed. For purposes of illustration of the preferred embodiment of the invention, a second battery of nests, generally designated by the reference numeral 27, is disposed in a back-to-back arrangement on the other side of a centrally located belt-type conveyor 28, as is clearly illustrated in FIG. 1. The second battery of nests 27 is identically constructed in the manner described for the first battery of nests 1, and thus will not be described in detail herein. Suffice it to say that each of the individual nests 15 of the battery 27 also has a rear wall 29 and an egg door arrangement constructed in accordance with the teachings of the present invention and presently to be described.

Each of the battery of nests 1 and 27 is, in accordance with present invention, further broken down into separate units of construction, generally designated by the references A, B, C whereby the battery 1 can be advantageously extended in the longitudinal direction by merely adding additional units of nests; it being understood that only the end portions of the units A and C are illustrated and that the unit B is partially broken away. In the embodiment shown, the centrally located conveyor 28 serves all of the several units A, B, C of the apparatus and each of the units A, B, C has its own separate perch 26 and egg door arrangement; the latter now to be described.

As perhaps best illustrated in FIG. 2, the nest pad 18 and the forming member 17 of the nests is disposed between adjacent side walls 13 by the hold-down members 19 for a specific reason, which is so that the pad 18 can define a rearwardly sloping floor F of the nest 15 whereby an egg 30 laid in the nest will roll by gravity along a centrally located path through suitable openings 31 orientated with corresponding nests 15 in the rear wall 12 of the battery of nests 1. Similarly, of course, each individual nest 15 of the second battery of nests 27 has similar openings 32 in its rear wall 29. Thus, since the nest pad 18 is arcuately curved and rearwardly sloping in the manner indicated, the eggs 30 will exit the individual nests 15 by gravity through the centrally located openings 31, 32 unless retained by some additional means. For this purpose, I provide novel egg doors or barriers 35, 36 to periodically block the openings 31, 32, respectively; which doors are shown in the raised or out-of-the-way position in the full line view of this figure and in the egg blocking position in the dashed line outline.

The shaped or curved pad 18 is preferably formed of plastic impregnated sisal fibers to form the resilient yet firm floor F in order to provide protection for the eggs in the nest. For the same purpose the doors 35, 36 are provided with protective door pads 35a, 36a, respectively, to absorb any shock of the egg 30 as it rolls the short distance to the lower-most part of the nest from the position where it has been laid by the hen to await the timed opening of the egg door 35. With this arrangement, it will be seen that the chances of the egg being broken due to the force created by its rolling momentum is minimized. Thus, as contemplated, the egg is safely retained in the nest so that it can be viewed by the hen until time for it to be released along with all of the other eggs in the system to be forwarded to the final collecting point.

Figure 3:
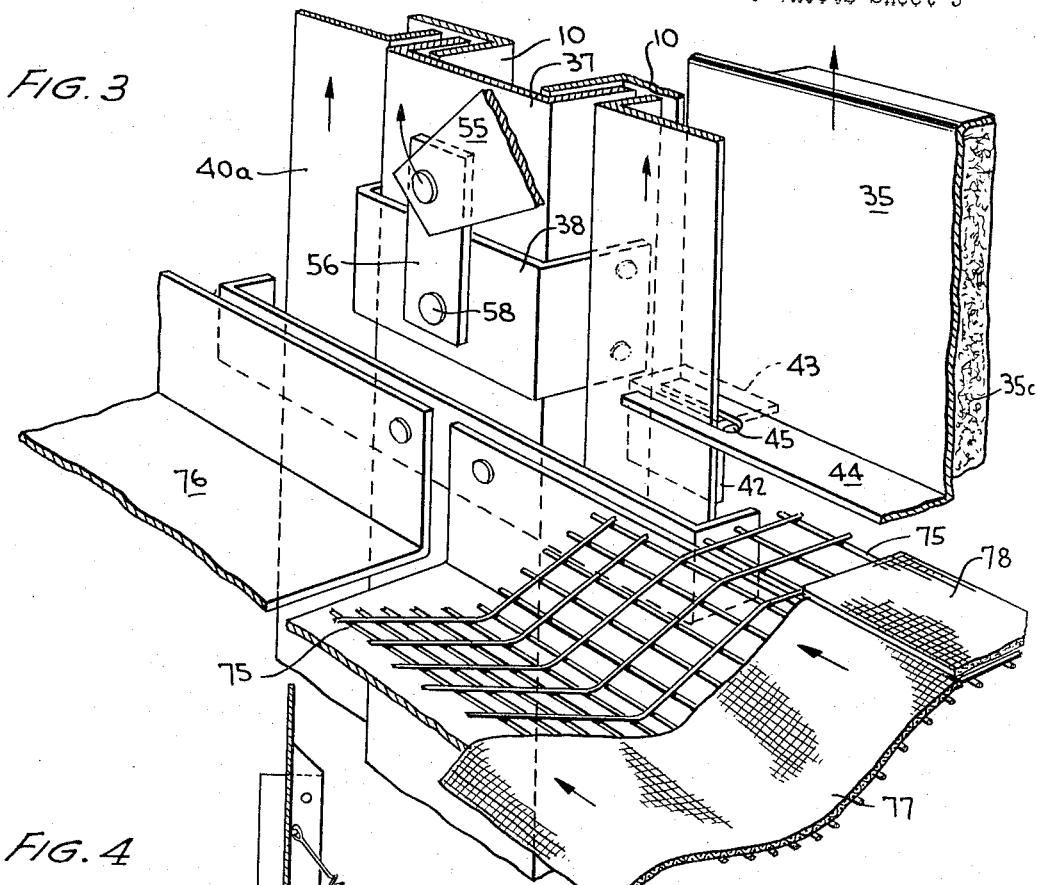
FIG. 3 is an enlarged perspective view of a portion of the operating mechanism illustrated in FIG. 2.

To explain the operation of the egg door or barrier 35, 36 into and out of the path of the egg 30 which has been laid in the nest 15, reference is now made to FIG. 3 wherein the door 35 is shown in the partially raised position. It will be remembered that the vertical posts 10 are stationary frame members and a pair of these posts 10 of adjacent units A, B, or B, C form a mounting means for a vertical stationary channel member 37 that interconnects the adjoining units of the battery of nests 1, and 27. The channel member 37 not only serves to conveniently connect the units A, B, C into the continuous structures illustrated, but also serves as a guideway for a U-shaped slide 38 which loosely conforms to the guiding surface of the corresponding channel member 37. Fixedly attached to either side of the slide 38 are elevator bars 40, 40a designed to cooperate with the ends of the egg door or barrier 35 by means of an angle member 42 secured along one leg thereof to the elevator bars 40, 40a and supporting one end of the door 35 on the outwardly extending leg forming a lip or boss 43. Thus, as the elevator bars 40, 40a are operated by the slide 38, the egg door 35 will be engaged along a lower flange 44 thereof which has a slot 45 suitably cut near its end to accommodate the elevator bars 40, 40a for proper positioning of the door 35.

An important feature of the present invention is best illustrated in FIG. 1 and lies in the fact that the egg door or barrier 35 just described extends along the entire unit A, B or C of nests 15 positioned between cooperating egg door operating mechanisms mounted on the unit-connecting channel members 37. Accordingly, as the elevator bars 40, 40a are positioned adjacent opposite ends of the door 35 and insofar as the elevator slides 38 are operated simultaneously in a manner to be described subsequently, then the door 35 is advantageously operated into and out of the path of the eggs from the individual nests 15 at substantially the same time whereby all of the eggs enter the egg collecting conveyor 28 together. Also, it will be noted that the egg door 35 is supported during its movement by the lips 43 and is retained in the proper positioning at all times by the slotted portions 45.

Still referring to FIG. 1, it should be realized that the egg door 36 operates in the same manner as the egg door 35 and, therefore, the operating mechanism for the ends of the door 36 is identical. Consequently, the same reference numerals as used to describe the door-operating mechanism of the battery of nests 1 have been assigned to the corresponding parts of the battery of nests 27.

Figure 4:
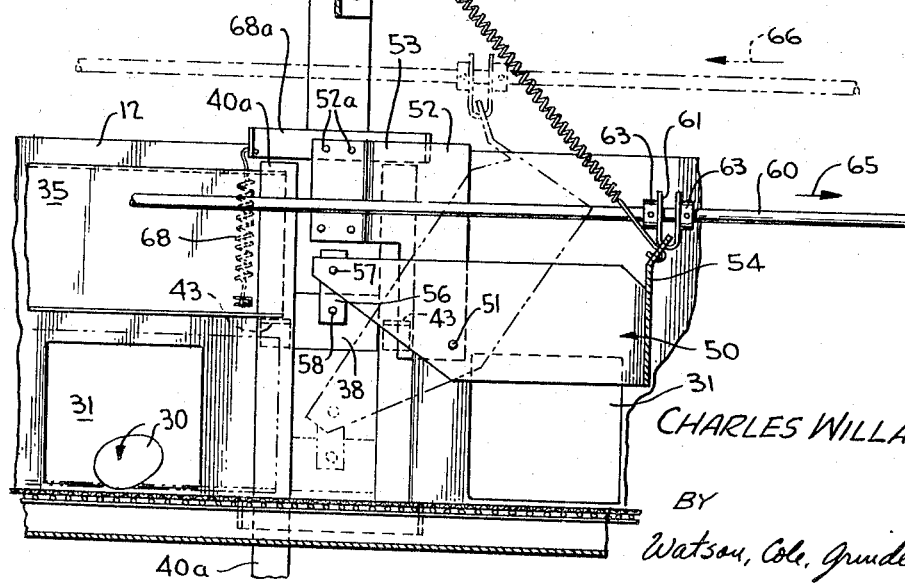
FIG. 4 is a cross-sectional view taken along line 4—4 of FIG. 1.

To operate the vertically reciprocable slides 38 to actuate the egg doors 35, 36 of the unit B, for example, there is provided a pair of rocker members 50 pivotably mounted about pivot pins 51 which are securely held by stationary depending support members 52 securely fastened to the unit-connecting channel members 37 by any number of suitable fastening means 52a (see FIGURE 4). As best shown in the right-hand operating location of FIG. 1, these depending support members 52 are provided with a jogged-out portion 53 in order to not hamper the normal operation of the egg doors 35, 36.

The rocker 50 desirably takes the form of a U with a cross portion 54 and a pair of outwardly extending arms 55, the latter of which are pivotally associated with the depending support members 52 at a point approximately two-thirds of their length from the cross portion 54 by the pivot pins 51. The terminal ends of the arms 55 are interconnected with the vertical slide 38 by captive links 56 adapted for movement about either pivot 57 on the arm 55 or pivot 58 on the slide 38, as can clearly be seen in FIGS. 3 or 4.

The means for swinging the rockers 50 in their arcual path to actuate the slides 38 and, in turn, the doors 35, 36 is illustrated in the form of a reciprocal rod 60 that interconnects the cross portions 54 of the rockers 50 and is preferably supported by the latter. The rod 60 is suitably fastened to the cross portion 54 by a hook 61 extending through an elongated aperture 62 (FIG. 1); the hook 61 being retained in a desired position by oppositely cooperating collars 63 adjustably fixed to the shaft 60.

Now with reference to FIG. 4, the operation of the operating mechanism for the doors 35, 36 can be understood. Thus, as the rod 60 is reciprocated to the right, as indicated by the solid-line arrow 65, the rocker 50 is pivoted about the pivot 51 causing the slide 38 to move in the upward direction because of the interconnection by link 56. As the full-line position of the rocker 50 is reached, the door 35 (note left-hand side of the figure) has been moved out of the egg opening 31 due to the raising and supporting action of the elevator bar 40a and its integral door-engaging lip 43. Then as the rod 60 is moved to the left, as indicated by the dashed-arrow 66, the rod 60 is moved in an arcual path by its supporting relationship with the rocker 50 and the slide 38 is moved to its lowest point of travel whereupon the door 35 can assume the egg-blocking relationship in front of the opening 31, as indicated in the dashed-line outline.

The egg door or barrier 35 is guided in its up-and-down movement between the full line position and the dashed-line position of FIG. 4 by means of the face of the rear wall 12 and a tension spring 68 on the nest side of the door 35 and by the engaging relationship of the elevator bar and the slot 45 on the conveyor side of the door 35. The spring 68 depending from fixed flange 68a serves an important function of counter-balancing the weight of the door 35 to cause said door to float above the egg path so that it is easier to lift and, more importantly, so that in the event the egg 30 becomes lodged in the path of the door 35, the full weight of the door will not act on the egg 30, thus, lessening the possibility of damaging the egg. A spring 69 is provided to counter-balance the forward portion of the rocker 50 as the rod 60 is moved to the door-open position whereby the tension of said spring 69 can be utilized to provide the motive force for directing the rod 60 to move to the left, as indicated by the dashed-arrow 66, and thereby position the door 35 in the closed position across the path of the egg 30. The springs 68 are carefully selected to perform their counterbalancing function while still allowing the egg doors 35, 36 to assume its full closed position, and the number of springs 69 associated with the rockers 50 can be selected so as to give the desired action in this respect. Also, it is pointed out that in accordance with the present invention, the weight of the forward two-thirds of the rocker member 50 having the cross portion 54 tends to balance the increased force of the spring 69 as it stretches to its full extent. In other words, as the rocker 50 rocks to its full line position of FIG. 4 its ability to offset the increased force of the spring 69 is increased due to the larger effective fulcrum measured to pivot pins 51 about which the rocker member 50 pivots.

Thus, by providing this system of cooperating springs 68, 69 operating in conjunction with the door-raising apparatus just described, a motor M, shown in FIG. 5, can easily effect movement of a large number of doors 35, 36 in a plurality of egg-collecting units A, B, C by means of a conventional one revolution clutch 70 and crank 70a; the latter being connected to the single actuating bar 60 for the doors 35, 36 in the manner indicated.

The motor M is preferably controlled by an automatic intermittent timer 71 in a motor circuit, indicated by numeral 72, so that the egg doors of the present invention will be actuated at spaced intervals. The timer 71 is or may be of conventional design allowing suitable adjustment for the time period between the egg-collecting operations. In normal operation, the timer is set so as to permit the apparatus of the present invention to remain at rest most of the time and to energize the motor M and drive the one revolution mechanism only for relatively brief periods of time at rather widely spaced intervals.

The motor circuit 72 is provided with a manually-operable switch generally designated by the reference numeral 73, to permit operation of the device of the present invention manually as desired. For example, at the end of a day the motor M can be stepped around so that the crank 70 is only half way through its revolutionary cycle and thereby the doors 35, 36 will be held in the raised position in order to be able to transfer any eggs remaining in the nest to the conveyor in an easy operation.

The means for delivering the eggs 30 transversely of the conveyor 28 after leaving the nests 15 is incorporated in the structure of the conveyor itself in the form of sloped metal wire grating 75 supported by a longitudinally extending metal trough 76; the metal grating 75 having disposed thereon a suitable endless conveyor belt 77 for movement with the eggs upon actuation of motor $M_1$ in response to the timer 71 (see FIG. 5). As best shown in FIG. 3, the metal grating 75 is extended out beyond the conveyor belt 77 in such a manner as to allow the egg door 35 to rest upon the grating 75 in the closed position. Also, since the grating 75 extends up to the opening 31, 32 for the purpose of receiving the eggs 30 and transferring them to the operative portion of the conveyor 28, it is desirable to provide a piece of strip padding 78 along each of the outwardly or laterally extending portions of the grating 75 to provide a continuous surface for the eggs as they roll from the nest.

According to another feature of the present invention the grating 75 is provided with a centrally located hump or raised portion 79 to retain eggs 30a and 30b emitted from the first and second batteries of nests 1 and 27, respectively, in transverse spaced relationship as indicated in FIG. 2. This feature is important when the apparatus of the present invention is arranged in the back-to-back relationship shown in the preferred embodiment, since in the event that eggs have been laid in directly opposed nests 15, when the egg doors 35, 36 are simultaneously raised these eggs 30a, 30b are moved to their respective low spots on the conveyor without touching each other so that they will not be damaged by hitting together. The conveyor 77 is driven in the longitudinal direction to deliver the eggs to the desired collecting point as the doors 35, 36 open so that the eggs are more quickly gathered and transported to a desired collection point P than has heretofore been possible.

For assisting the hens in entering of the nests 15, it will be remembered that the perches 26 are provided for each of the units A, B, C of the nests, and these perches 26 may be suitably pivotally mounted about pivot points 80 for each tier U or L of nests and interconnected by a suitable rod 81 in a conventional manner. These combined perch and closures 26 are thus adapted to be moved between the full line operative position of FIG. 2 and the dotted line position, whereupon the perch 26 becomes a closure for the front of each of the nests 15. The perches 26 many be swung to this closed position and retained by a latch bar 82 having a notched portion 82a at such times as it is desired to prevent the hens from entering the nest.

In order to permit simultaneously actuation of all of the combined perch and closures 26 into the operative perch-forming position and in accordance with the present invention, the latch bar 82 is pivoted about a fixed pivot pin 83 mounted between spaced flanges 84, 85 (see FIGS. 1 and 2). In the preferred embodiment, the pivot 83 is preferably made integral with the rod 82 and mounted between an aperture (not shown) in flange 84 and the lower end of a vertical slot 86 in the flange 85 whereby the bar 82 may be easily positioned in its operative location. The end of the rod 82 opposite the latch notch 82a extends over the conveyor 28 and is within the arc of movement of the reciprocal bar 60. Accordingly, in operation, the perches 26 may be positioned in the closed dotted-line position when the egg doors 35, 36 have been closed by the combined force of the spring 69 and the one-revolution crank drive 70, 70a. Then, when it is wished to activate the apparatus of the invention and to open the perches 26 to allow the hens to enter the nests for laying, the motor circuit 72 is energized whereupon the crank 70a causes each of the rockers 50 to move to the full-line position of FIG. 2 thereby camming down the adjacent end of the latch bar 82 whereupon the perches 26 fall by gravity to the full-line position of this figure. During this initial run of the apparatus, eggs that may have possibly remained in the nests overnight are cleared by the operation of the doors 35, 36 and the conveyor 28. During subsequent intermittent egg-collecting operations of the apparatus of the invention, the latch bar 82 continues to idly move between the full and dotted-line positions of FIG. 2 in readiness to release the perches 26 should they be closed for any reason.

Summarily speaking, the egg door or barriers 35, 36 and the perches 26 are thus operated automatically and in conjunction with each other. This feature is particularly important since it lessens the work that the operator must perform to place the nests in condition for operation. Also in the present arrangement, it is assured that the perches 26 will be opened simultaneously so that each of the nests 15 is immediately ready for use at the beginning of the day.

In the overall operation, after the perches 26 have been positioned for use as just described, the hens are then free to enter the respective nest 15 and assume the position shown by the hen 25 in FIG. 1 Whenever a hen in one of the nests lays and egg, the egg 30 rolls the relatively short distance along the nest floor F in the direction illustrated in FIG. 1 and comes to rest against the egg barrier whereby it is retained for a period in the nest with the hen and in spaced relationship to the conveyor 28. At periodic intervals, the intermittent timer 71 causes the doors 35, 36 to be raised out of the path of the egg so that it may cross the strip padding 78 and roll down to the adjacent lowermost part of the conveyor 28 on the respective side of said conveyor. It is emphasized that the egg doors 35, 36 are desirably raised at the same time so that any eggs 30a, 30b in both batteries of nests 1 and 27, respectively, enter the conveyor 28 simultaneously and each seeks its respective lowermost part of the conveyor 28, as well illustrated by the showing in FIG. 2. At this point in the operation, the motor M, has already commenced driving the belt 77 of the conveyor 28, which driving continues in the manner described for a preselected period to carry the eggs along to the desired collection point P.

Thus, it can be seen that the eggs produced in the apparatus of the present invention are retained in the nest for a desired length of time so that hen will be encouraged to lay more eggs and at the same time the eggs are not subject to rolling by gravity across great distances which would the eggs to gather momentum and possibly cause breaking or cracking of the eggs as they engage a barrier designed to retain the egg with the hen for a desired period of time. Further, it can be seen that upon reaching the final resting place on the conveyor belt 77, the eggs from the opposed batteries of nests 1 and 27 will remain separated by the centrally located raised portion 79. Also, with the apparatus of the present invention it will be understood by those skilled in the art that any number of units and batteries of nests can be operated in a very efficient and convenient manner.

In this application, there is shown and described only the preferred embodiment of the invention, but, as aforementioned, it is to be understood that the invention is capable of various changes or modifications within the scope of the inventive concept as expressed by the accompanying claims.

What is claimed is:

1. An egg collecting apparatus for a battery of longitudinally and horizontally aligned laying nests comprising a longitudinally extending egg collecting trough disposed adjacent said nests in direct egg receiving communication with said nests, each of said nests having a floor sloping downwardly, said floor and said trough forming a substantially continuous surface for delivery of the eggs by gravity transversely onto said trough along a predetermined path, a longitudinally disposed egg barrier supported along the length of said battery of nests at an intermediate point along said path for substantially vertical movement into and out of said paths for eggs moving transversely onto said trough from each of said nests, vertically movable lifter means having a portion engaging said barrier to cause said movement out of said paths, said barrier being supported against gravity by said portion above said paths during said movement and free to be disengaged from said portion upon movement back into said paths, and drive means for operation of said lifter means, whereby said barrier is operated into and out of each of said paths and thereby delivering the eggs in said nests to said trough.

2. The combination of claim 1 wherein said lifter means includes a pair of elevator bars mounted for sliding movement in a vertical direction, one of said bars adjacent each end of said battery of nests, and wherein said portion comprises an outwardly extending boss on each of said elevator bars for operatively engaging and disengaging the respective ends of said barrier to raise said barrier out of said paths and to allow said barrier to lower into said paths by gravity.

3. The combination of claim 2 wherein said drive means includes a pair of rocker members mounted for pivotal movement about a horizontal axis, one of said rocker members adjacent each end of said battery, one end of each of said rocker members being connected to its respective elevator bar, a reciprocable rod extending longitudinally of said battery of nests and interconnecting the other ends of said rocker members, said rod being mounted by said other ends of said rocker members for movement in an arcuate path and crank means for imparting reciprocating motion to said rod.

4. The combination of claim 3, wherein there is further provided spring means fastened to said barrier to counterbalance the weight of said barrier and further spring means fastened to at least one of said other ends of said rocker members for counterbalancing said drive means, said rocker members being pivoted at a point substantially two-thirds their length measured from said other end whereby the weight of said rocker member tends to offset the increased force of said further spring means as the latter stretches to its full extent.

5. The combination of claim 3, wherein is further provided a downwardly swingable perch extending longitudinally of said nests, said perch being movable to the lowered operative position by gravity, and lock means for retaining said perch in the raised inoperative position, said lock means being operative to release said perch in response to the movement of said reciprocable rod in said arcuate path.

6. The combination of claim 5, wherein said lock means comprises a pivotally mounted bar extending transversely of said battery of nests, one end of said bar lockingly engaging said perch in said raised position and the other end of said bar being positioned in the arcuate path of movement of said bar to effect release of said perch from said raised position.

7. The combination of claim 6, wherein is further provided a conveyor having an operative horizontal run disposed for longitudinal movement in said trough for transferring the eggs along said trough and means for moving said eggs on said conveyor transversely toward the center of said conveyor.

8. An egg collecting apparatus for first and second batteries of longitudinally and horizontally aligned laying nests arranged in a back-to-back relationship comprising a trough, a conveyor having an operative horizontal run disposed for longitudinal movement between said first and second batteries of nests, said operative run of said conveyor being disposed adjacent to said nests in direct egg receiving communication with said nests, each of said nests having a floor sloping downwardly, said floor and said trough forming a substantially continuous surface for delivery of the eggs by gravity transversely onto said conveyor along a predetermined path, a longitudinally disposed egg barrier supported along the length of each of said batteries of nests at an intermediate point along said path for substantially vertical movement into and out of said paths for eggs moving transversely onto said conveyor from each of said nests, lifter means operatively associated with said barriers to cause said movement and for supporting said barriers above said paths during said movement, drive means for operation of said lifter means whereby said barriers are operated into and out of each of said paths and thereby delivering the eggs in said nests to said conveyor and means for moving the eggs transversely on said conveyor and for stopping said transverse movement of the eggs while the eggs from said first battery of nests are in spaced relationship to the eggs from said second battery of nests, said last mentioned means comprising a first and second portion of said conveyor adjacent said first and second batteries of nests, respectively, said first and second portions of said conveyor sloping transversely downwardly away from the respective nests to cause the eggs to move by gravity toward the center of said conveyor and a raised portion of said conveyor disposed between said first and second portions to limit the transverse movement of said eggs.

9. An egg collecting apparatus for first and second batteries of longitudinally and horizontally aligned laying nests arranged in a back-to-back relationship comprising a trough, a conveyor having an operative horizontal run disposed for longitudinal movement between said first and second batteries of nests, said operative run of said conveyor being disposed adjacent to said nests in direct egg receiving communication with said nests, each of said nests having a floor sloping downwardly, said floor and said trough forming a substantially continuous surface for delivery of the eggs by gravity transversely onto said conveyor along a predetermined path, a longitudinally disposed egg barrier supported along the length of each of said batteries of nests at an intermediate point along said path for substantially vertical movement into and out of said paths for eggs moving transversely onto said conveyor from each of said nests, lifter means operatively associated with said barriers to cause said movement and for supporting said barriers above said paths during said movement, drive means for operation of said lifter means whereby said barriers are operated into and out of each of said paths and thereby delivering the eggs in said nests to said conveyor and means for moving the eggs transversely on said conveyor and for stopping said transverse movement of the eggs while the eggs from said first battery of nests are in spaced relationship to the eggs from said second battery of nests, said lifter means including a pair of elevator bars mounted for sliding movement in a vertical direction, one of said bars adjacent each end of said batteries of nests, and an outwardly extending boss on each of said elevator bars for operatively engaging the respective ends of said barriers, said drive means including a pair of rocker members mounted for pivotal movement about a horizontal axis, one of said rocker members adjacent each end of said batteries of nests, one end of each of said rocker members being connected to its respective elevator bar, a reciprocable rod extending longitudinally of said batteries of nests and interconnecting the other ends of said rocker members, said rod being mounted by said other ends of said rocker members for movement in an arcuate path and crank means for imparting reciprocating motion to said rod.

10. An egg collecting apparatus for first and second batteries each consisting of a plurality of units of longitudinally and horizontally aligned laying nests arranged in a back-to-back relationship comprising a trough, a conveyor having an operative horizontal run disposed for longitudinal movement between said first and second batteries of nests in said trough, said trough supporting said operative run of said conveyor being disposed adjacent to said nests in direct egg receiving communication with said nests, each of said nests having a floor sloping downwardly, said floor and said trough forming a substantially continuous surface for delivery of the eggs by gravity transversely onto said conveyor along a predetermined path, a longitudinally disposed egg barrier supported along the length of each of said units of nests at an intermediate point along said paths for substantially vertical movement into and out of said paths for eggs moving transversely onto said conveyor from each of said nests, lifter means operatively associated with said barriers to cause said movement and for supporting said barriers above said paths during said movement, drive means for operation of said lifter means whereby said barriers are operated into and out of each of said paths and thereby delivering the eggs in said nests to said conveyor, means for moving the eggs transversely on said conveyor and for stopping said transverse movement of the eggs while the eggs from said first battery of nests are in spaced relationship to the eggs from said second battery of nests, vertically extending channel members fastened to the ends of adjacent units to interconnect the same to form said batteries, said channel members forming guides for said lifter means.

11. The combination of claim 10, wherein said lifter means includes a pair of elevator bars mounted for sliding movement in a vertical direction, one of said bars adjacent each end of said units of nests, an outwardly extending boss on each of said elevator bars for operatively engaging the respective ends of said barriers, and a member interconnecting one of said bars for a first unit of nests and an adjacent one of said bars for a second unit of nests.

12. The combination of claim 1 wherein said lifter means includes spring means fastened to said barrier to counterbalance the weight of said barrier whereby said barrier is caused to float under the action of said spring means above said path.

13. The combination of claim 1 wherein is further provided a lateral extension of said trough at each of said nests to form the intermediate portion of said path.

References Cited by the Examiner
UNITED STATES PATENTS

| | | | |
|---|---|---|---|
| 2,536,621 | 1/1951 | Arnold | 119—51 |
| 2,987,038 | 6/1961 | Cole | 119—18 |
| 3,124,102 | 3/1964 | Kurtz et al. | 119—48 |
| 3,145,793 | 8/1964 | Ray | 177—8 |

SAMUEL KOREN, *Primary Examiner.*

HUGH R. CHAMBLEE, *Examiner.*